United States Patent
Hayes et al.

(10) Patent No.: US 10,391,456 B2
(45) Date of Patent: *Aug. 27, 2019

(54) ELECTROLYTE CHEMISTRY AND IMPROVED STACK PERFORMANCE IN HIGH BRINE CONCENTRATION ELECTRODIALYSIS

(71) Applicant: GAS TECHNOLOGY INSTITUTE, Des Plaines, IL (US)

(72) Inventors: Thomas D. Hayes, Schaumburg, IL (US); Blaine F. Severin, Okemos, MI (US)

(73) Assignee: GAS TECHNOLOGY INSTITUTE, Des Plaines, IL (US)

( * ) Notice: Subject to any disclaimer, the term of this patent is extended or adjusted under 35 U.S.C. 154(b) by 75 days.

This patent is subject to a terminal disclaimer.

(21) Appl. No.: 14/616,227

(22) Filed: Feb. 6, 2015

(65) Prior Publication Data

US 2016/0228820 A1 Aug. 11, 2016

(51) Int. Cl.
*B01D 61/54* (2006.01)
*B01D 61/42* (2006.01)
*B01D 65/02* (2006.01)
*B01D 61/52* (2006.01)

(52) U.S. Cl.
CPC .......... *B01D 65/027* (2013.01); *B01D 61/52* (2013.01); *B01D 2311/12* (2013.01); *B01D 2311/246* (2013.01); *B01D 2313/345* (2013.01); *B01D 2321/22* (2013.01); *B01D 2321/223* (2013.01)

(58) Field of Classification Search
CPC .................. B01D 61/422; B01D 61/44–54
See application file for complete search history.

(56) References Cited

U.S. PATENT DOCUMENTS

| | | | | |
|---|---|---|---|---|
| 3,869,376 A * | 3/1975 | Tejeda | B01D 61/48 204/632 |
| 5,324,403 A | 6/1994 | Kennedy et al. | |
| 7,632,387 B1 * | 12/2009 | Hryn et al. | B01D 61/445 204/525 |
| 9,849,426 B2 * | 12/2017 | Hayes | B01D 61/46 |
| 2004/0055955 A1 * | 3/2004 | Davis | B01D 61/44 210/652 |
| 2006/0060532 A1 | 3/2006 | Davis | |
| 2007/0084728 A1 * | 4/2007 | Martez | B01D 61/44 204/627 |
| 2008/0067125 A1 * | 3/2008 | Wilkins | B01D 61/58 210/641 |
| 2009/0142627 A1 * | 6/2009 | Shimomura | C02F 3/30 429/2 |
| 2012/0292187 A1 * | 11/2012 | Kim | B01D 61/44 204/527 |
| 2014/0197029 A1 * | 7/2014 | Sparrow | B01D 65/02 204/519 |

OTHER PUBLICATIONS

M. Ben Sik Ali, A. Mnif, B. Hamrouni, M. Dhahbi. "Desalination of brackish water using electrodialysis: Effect of operational conditions". Zaštita materijala. (no month) 2009. vol. 50, Issue 3. pp. 141-146.*
K.E. Bouhidel, K. Oulmi. "Concentration polarization in electrodialysis: Buffer solutions experimental method". Desalination. Dec. 2000. vol. 132. pp. 199-204.*
OChemOnline. "Buffer solutions" Last updated Jan. 1, 2011. Accessed at <http://www.ochemonline.com/Buffer_solutions> (Year: 2011).*
Kaakinen, J. et al., "High Recovery Desalting of Brackish Water by Electrodialysis: Field Tests at Yuma Desalting Test Facility & at La Verkin Springs", Report REC-ERC-84-24, Bureau of Land Reclam. Energy & Rsch Ctr, Denver, Colorado, Dec. 1984.
Marshall, W. et al., "Aqueous Systems at High Temperature", Jnl of Chem. and Eng. Data, 1968, v. 13, pp. 83-93 (Abstract).
Xu, T. et al., "Electrodialysis-Based Technologies, a Critical Review", AIChE Journal, Dec. 2008, v. 54, pp. 3147-3159.
Concurrently-filed U.S. Patent Application, Thomas D. Hayes et al., filed Feb. 6, 2015, "Electrolyte Chemistry Control in Electrodialysis Processing".
Firdaous, L. et al., "Transfer of Monovalent and Divalent Cations in Salt Solutions by Electrodialysis," Separation Science and Tech., 2007, vol. 42, pp. 931-948.
Taky, M. et al., "Transport properties of a commerical cation-exchange membrane in contact with divalent cations or proton-divalent cation solutions during electrodialysis," Elsevier, Hydrometallurgy, 1996, vol. 43, pp. 63-78.

* cited by examiner

*Primary Examiner* — Steven A. Friday
(74) *Attorney, Agent, or Firm* — Pauley Erickson & Kottis

(57) ABSTRACT

Methods for improving ion flux and energy efficiency in a membrane stack of an electrodialysis unit wherein the membrane stack is disposed between an anode and a cathode each in an electrolyte of a selected concentration. Methods include increasing the concentration of the electrolyte, adding a strong base to the electrolyte and adding buffering anions to the electrolyte. Methods for cleaning the electrodes of such a unit involving involve applying a pulsed polarity reversal to the electrodes. Also provided are methods for improving unit operation by increasing the basicity of the electrolyte to the anode and increasing the acidity of the electrolyte to the cathode or alternatively or in addition, by applying heat to increase the operating temperature of at least one of the electrolyte and the treated water stream.

15 Claims, 10 Drawing Sheets

ELECTROLYTE CHEMISTRY AND IMPROVED STACK PERFORMANCE IN HIGH BRINE CONCENTRATION ELECTRODIALYSIS

STATEMENT REGARDING FEDERALLY SPONSORED RESEARCH OR DEVELOPMENT

This invention was made with government support under grant DE-AC26-07NT42677 awarded by the Department of Energy (DOE). The government has certain rights in the invention.

BACKGROUND OF THE INVENTION

This invention relates generally to electrodialysis and, more particularly to electrodialysis employing high brine concentrations.

Electrodialysis is a membrane separation technology in which stacked pairs of selective cationic and anion selective membranes are typically used to segregate increasingly dilute salt streams from concentrated salt streams. Stacks of membrane pairs can be very large and can include 10 to 100 or more pairs of alternating membranes. At one end of the stack, electrochemical reactions are produced by a cathode in electrolyte solution. At the other end of the stack, another reaction is created by an anode in electrolyte solution. In the usual process, the electrolyte stream is separated from the dilute salt and the concentrated salt flows. The electrolyte solution is continuously applied to the electrodes. Furthermore, care is taken to collect the electrolyte streams from the anode and cathode reaction zones and remix the electrolyte prior to reapplication to the electrodes.

As will be appreciated by those skilled in the art, the general purpose of keeping solution flowing past the electrodes is to minimize the build-up of hydroxide ion at the cathode by virtue of acid destruction, and the build-up of excess acid at the anode by virtue of hydroxide destruction. Remixing the two electrolyte streams has the purpose of blend neutralizing the acid and base conditions that naturally occur.

The reactions at the anode and the cathode are integral to the process. It is the transfer of the electrons in the half-cell reactions that cause continued polarization that in-turn, causes the flux of salt ions across the selective membranes. Without initiation of the electrolysis reaction, electrodialysis cannot proceed.

In practice, there are several junctions within conventional electrodialysis processing that will or can impede efficient ion transfer. These include:

1) Boundary diffusion resistance at all membrane surfaces;
2) Resistance to current transmittal in all solutions;
3) Relative difference in dilute and concentrate streams concentrations;
4) Potential drop at each membrane; and
5) Reaction initiation and transfer of ions at the electrodes.

When electrodialysis is used in a conventional manner to treat light brine (e.g., brine that in general contains less than 1% salt and in some cases salt in a relative amount of as few as few hundred parts per million, i.e., high voltage and low amperage), one must be careful to avoid what is referred to as "limiting current" conditions. Limiting current is caused by applying too high a voltage such that instead of salt ion transfer, water at or near the membrane is caused to "split" into hydrogen ion and hydroxide ion. This can cause transfer of hydrogen ions and hydroxide ions across the respective membrane instead of the beneficial transfer of salt ions. Thus, amperage is generated by transfer of non-beneficial ions caused by the water splitting. This condition can be destructive to the membranes for a variety of reasons.

However, when electrodialysis is used or applied at conditions to treat heavy brine or high salt concentrations (e.g., brine containing 1-8% salt down to 0.5% salt; i.e., low voltage and high amperage) such operation is very far from the "limiting current" conditions that pertain to conventional operation. Thus, such operation presents challenges and issues not addressed by conventional practice or operation.

An electrodialysis unit is typically composed of two fundamental components: electrodes cells consisting of an anode and a cathode; and a membrane stack of hydraulically isolated concentrate and diluate streams (the treatment cells) disposed therebetween. The electrode cells and the membrane stack are hydraulically isolated, but intimately associated electrochemically. Simplistically, the process can be viewed as an electric potential; pitted against a series of resistances; that generates an electric current at the electrodes. The electric current is translated into ion flux across the membrane stack. A partial list of the process dynamic and equilibrium resistances that can cause loss of potential (voltage drop) are summarized in the following Table 1, below.

TABLE 1

| | |
|---|---|
| Cathode | Electrode potential (Eo) for H+ reduction to H2 |
| Cathode | Diffusion of H+ to the electrode |
| Cathode | Overvoltage (unknown excess above Eo)/water splitting at electrode |
| Cathode | Back diffusion of anion from the electrode cell |
| Cathode/Membrane Stack | Diffusion of cation into electrode cell |
| Membrane Stack diluate/concentrate | Diffusion of cation across the cation selective membrane/Back diffusion of counter ion |
| Membrane Stack diluate/concentrate | Diffusion of anion across the anion selective membrane/Back diffusion of counter ion |
| Membrane Stack | Resistance of membrane |
| Diluate/Concentrate | Osmotic pressure as a Nernst Potential |
| Anode | Electrode potential (Eo) for H2O/OH– oxidation to O2 |
| Anode | Diffusion of OH– to the electrode |
| Anode | Overvoltage (unknown excess above Eo)/water splitting at electrode |
| Anode | Back diffusion of cation from the electrode cell |
| Anode/Membrane Stack | Diffusion of cation into membrane stack |

Electrodialysis processing is conventionally operated in a salt concentration range of a few hundred ppm up to about 1% (10,000 ppm) total dissolved solids (TDS). Furthermore, conventional operation typically avoids cases where the divalent cation content of the water exceeds more than a few hundred milligrams per liter. Under such conditions, ion flux is usually limited by the "limiting current" at the membrane interfaces within the membrane stack. The voltage across the electrodes can be adjusted in order to avoid the limiting current condition. The limiting current is usually defined as a severe depletion of ions at the membrane surfaces such that the water boundary at the membrane "polarizes". Effectively, the driving force to move ions (the stack voltage) exceeds the diffusion rate of ions to (and from) the membrane. Under polarized conditions, water "splits" into hydrogen ion and hydroxide ion. The ionized water is transported in lieu of the target ions. Thus, at this limiting current condition, power is wasted by transferring hydrogen ion instead of the target cation (example: sodium ion) and/or hydroxide ion instead of the target anion (example: chloride). The polarized water also can cause rapid degradation of the membrane materials. Therefore, under these conventional salt ranges, the majority of development in the science of ED technology is driven by the prediction and avoidance of the polarization of water at the membrane surfaces.

In such conventional processing, the chemistry of the electrolyte is relatively simple. For example, a typical electrolyte solution contains about 30 g/L $Na_2SO_4$ and has a conductivity of about 28-30 mS/cm. This is usually sufficient since the water to be treated, 1% TDS as NaCl or less, has a conductivity of less than 16 mS/cm.

A steady flux of ions across the membrane stack balances the electrochemical reaction at the electrodes. Hydrogen ions are reduced to hydrogen gas at the cathode. The loss of $H^+$ in the catholyte causes an ion imbalance that requires the transport of a cation (e.g., sodium ion) from the membrane stack into the cathode cell. Oxygen is produced at the anode at the expense of hydroxide ion. The resultant loss of hydroxide by such oxidation necessitates the transport of a cation (e.g. sodium ion) away from the anolyte into the membrane stack in order to appease the loss of hydroxide at the cathode. The result is that the catholyte becomes basic and sodium rich while the anolyte becomes acidic and sodium poor. In order to maintain pH and sodium balance between the catholyte and the anolyte, it is common (after suitable degassing) to re-mix catholyte and anolyte to make a common electrolyte for re-application to the electrodes.

However, the application of electrodialysis to high brine conditions, i.e., 0.5% to 8% TDS, presents many and various challenges. For example, with the application of electrodialysis to high brine conditions the opportunities to create a "limiting current" condition at the membrane surfaces are typically severely limited as the ionic strength of the solution is so high.

Moreover, in highly concentrated brines containing significant concentrations of multivalent cations, such as magnesium, calcium, barium, and iron, the cations can cross from the water (usually from the diluate cell located adjacent to the cathode cell) into the cathode cell. Precipitation of calcium and barium as hydroxides or sulfates, or the precipitation of iron as a hydroxide at the electrodes is problematic and can result in a rapid increase in resistance to ion flux at the surface of the electrode. In practice this is observed as a decrease in current (amps) for a given voltage. In conventional electrodialysis, the presence of such multivalent cation ions cause a need for frequent cleaning of the electrodes. Conventional cleaning usually involves alternating flushes of both the electrode cells and the treatment cells with a strong acid (e.g. 1% HCl) followed by strong base (e.g., 1% NaOH). Conventional washing typically requires significant down time. An additional disadvantage of conventional cleaning is the need for handling and storage of strong chemical cleaning agents.

Further, while pole reversal has previously been applied during conventional electrodialysis, such conventional practice has typically involved switching the polarity of the electrode for extended periods of time, up to several hours per switch. In order to accommodate such pole reversal, there must also be a hydraulic shift that switches the concentrate stream to become the diluate stream, and vice-versa.

In view of the above, there is a need and a demand for improved electrodialysis processing and, more particularly to improved electrodialysis processing when using or in conjunction with the employment of high brine concentrations.

SUMMARY OF THE INVENTION

A general object of the invention is to provide improved electrodialysis and, more particularly, improved stack performance and electrolyte chemistry and in high brine concentration electrodialysis.

A more specific objective of the invention is to overcome one or more of the problems described above.

In accordance with one aspect of the invention there is provided, a method for improving ion flux and energy efficiency in an electrodialysis unit membrane stack. In accordance with one embodiment, a suitable electrodialysis unit includes an anode and a cathode each in an electrolyte of a selected concentration with the membrane stack disposed therebetween. The membrane stack includes pairs of cationic selective and anionic membranes to segregate increasingly dilute salts streams from concentrated salts stream. As detailed further below, ion flux and energy efficiency in the stack can be improved through or by using at least one selected from the group consisting of increasing the concentration of the electrolyte, adding a strong base to the electrolyte and adding buffering anions to the electrolyte.

In accordance with another aspect of the invention, there is provided an in-place method for cleaning the electrodes of an electrodialysis unit having an anode and a cathode electrode each in an electrolyte of a selected concentration and a membrane stack disposed therebetween. The membrane stack includes pairs of cationic selective and anionic membranes to segregate increasingly dilute salts streams from concentrated salts stream. In accordance with one embodiment, such an in-place method for cleaning the electrodes involves applying a pulsed polarity reversal to the electrodes.

In accordance with another aspect of the invention, there is provided a method for improving operation in an electrodialysis unit. The electrodialysis unit includes an anode and a cathode electrode each in an electrolyte of a selected concentration and a membrane stack disposed therebetween. The membrane stack includes pairs of cationic selective and anionic membranes to segregate increasingly diluted salt treated water stream from concentrated salts stream. In one embodiment such a method for improving operation involves suitably applying heat to increase the operating temperature of at least one of the electrolyte and the treated water stream.

As used herein, references to electrodialysis in "high brine conditions" are to be understood to generally refer electrodialysis processing at TDS levels of at least about 0.5% TDS, and in some cases more or greater than 1% TDS, and typically up to about 8% TDS, the conditions being such that there is little chance to create a "limiting current" condition at the membrane surfaces because the ionic strength of the solution is so high. Therefore, there is very little likelihood that the water splitting polarization can occur.

Other objects and advantages will be apparent to those skilled in the art from the following detailed description taken in conjunction with the appended claims and drawings.

DETAILED DESCRIPTION OF THE INVENTION

The present invention provides improved electrodialysis and, more particularly, improved stack performance and electrolyte chemistry and in high brine concentration electrodialysis.

Figure 1:
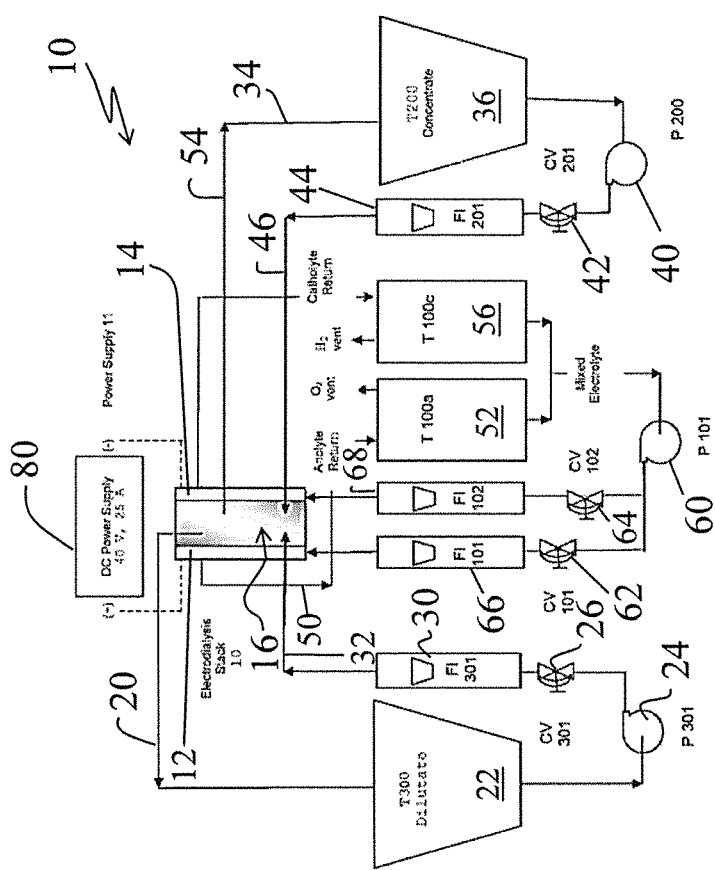
FIG. 1 is a simplified flow diagram of an electrodialysis pilot plant in accordance with one aspect of the invention.

Turning to FIG. 1, there is shown a simplified flow diagram of an electrodialysis pilot plant, generally designated by the reference numeral 10, in accordance with one aspect of the invention. Main components of the electrodialysis plant 10 include an anode electrode cell 12, a cathode electrode cell 14 and a membrane stack (also sometimes simply referred to as a "stack") 16 appropriately disposed between the anode and the cathode cells.

The membrane stack 16 is shown in greater detail in FIG. 2 and described further below.

As shown in FIG. 1, the diluate recovered from the membrane stack 16 is passed via a line 20 and is collected in a diluate tank 22. A pump 24, a control valve 26, and a rotometer 30 are used to appropriately deliver and control the flow of diluate via a line 32 to the diluate manifold within the membrane stack 16.

The concentrate recovered from the membrane stack 16 is passed via a line 34 and is collected in a concentrate tank 36. A pump 40, a control valve 42, and a rotometer 44 are used to appropriately deliver and control the flow of concentrate via a line 46 to the concentrate manifold within the membrane stack 16.

The electrolyte that has passed through the anode cell 12 is passed via a line 50 and collected in an anolyte tank 52. Likewise the electrolyte that has passed through the cathode cell 14 is passed via a line 54 and collected in a catholyte tank 56.

The production of the gases, oxygen and hydrogen, are well known and thought to follow chemical reactions as in Equations A1 and C1, below, at the anode 12 and at the cathode 14, respectively. It is important to understand that the anode produces oxygen gas in the anodic reaction and that the cathode produces hydrogen gas in the cathodic reaction. Tanks 52 and 56 are thus isolated to avoid a hazardous mixture of hydrogen and oxygen gases.

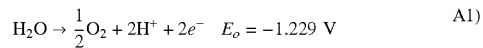

$$H_2O \rightarrow \frac{1}{2}O_2 + 2H^+ + 2e^- \quad E_o = -1.229 \text{ V} \quad \text{A1)}$$

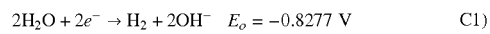

$$2H_2O + 2e^- \rightarrow H_2 + 2OH^- \quad E_o = -0.8277 \text{ V} \quad \text{C1)}$$

In the electrodialysis pilot plant 10, the feed of electrolyte to the electrode cells is provided by a single electrolyte pump 60 that captures electrolyte from both the anolyte and catholyte tanks, 52 and 56, in roughly the same proportions. This single pump feeds a pair of control valves 62 and 64, respectively, and respective associated flow indicators 66 and 68 that provide electrolyte separately to the anode 12 and the cathode 14, respectively.

Equation A1 suggests that the anolyte becomes acidic, whereas, Equation C1 suggests that the catholyte becomes basic. Thus, the remixing of the anolyte and catholyte, as done in this pilot plant design, causes a pH neutral solution to be applied to each electrode. This is the conventional means of handling electrolyte solutions with the desire to reconstitute a neutral pH condition before application to the electrodes.

The anode and cathode electrodes, 12 and 14, are appropriately connected to a Power Supply 80 which supplies power at a desired level.

Figure 2:
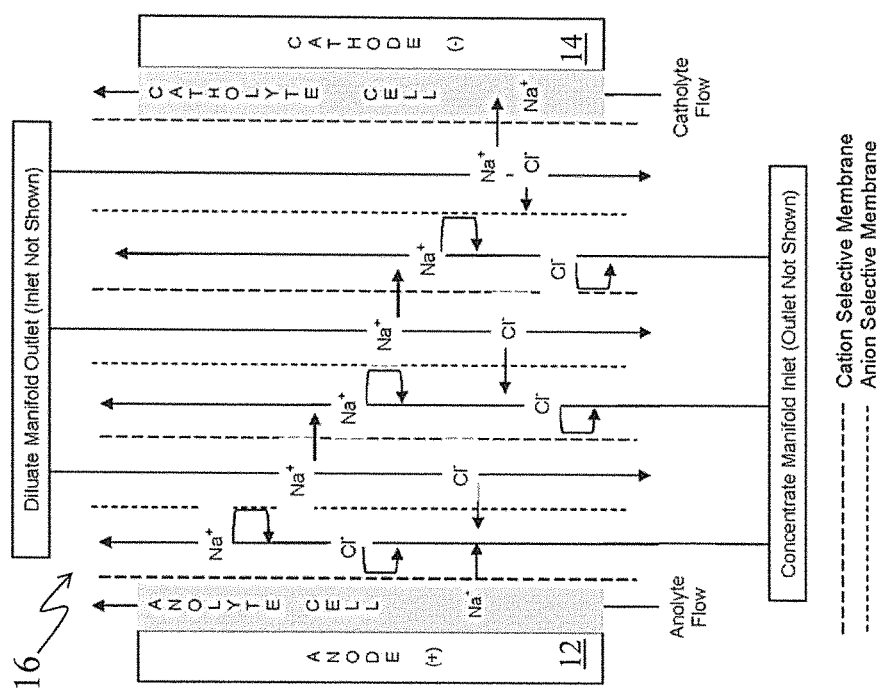
FIG. 2 is a simplified schematic of the electrodialysis membrane stack of the electrodialysis pilot plant shown in FIG. 1

Turning to FIG. 2, a schematic of the electrodialysis membrane stack 16 disposed between the anode cell 12 and the cathode cell 14, is shown in greater detail. The membrane stack 16 includes alternating cationic and anionic selective membranes, beginning and ending with cationic selective membranes.

By the nature of how the selective membranes are alternated, the flow of anions and cations are caused to become concentrated in one cell pair and diluted in the adjacent cell pair. As shown a manifold system is used to isolate the flow of concentrate from the flow of diluate.

The terminal cationic membranes, located at either end of the cell stack, serve to isolate a cathode within a cathode cell and an anode within an anode cell, each cell being located on opposite sides of the stack. The terminal cationic selective membranes also isolate a flow area where a flow of electrolyte solution is supplied to the electrodes.

As shown in this representation, sodium ions or other cations, can pass through the cation selective membranes. However, the cations are rejected by the anion selective membranes. Likewise, chloride ions, or other anions can pass through the anion selective membrane, but are rejected by the cation selective membranes.

When alternating pairs of cationic and anionic selective membranes are utilized, a dilute stream and a concentrate stream are produced. The dilute stream is connected in alternating cells by an inlet and an outlet manifold. The concentrate stream is connected in the opposing cells by an inlet and an outlet manifold.

In order to allow ion flow, and also to conserve sodium ions, it is necessary that each electrode be bounded by a cationic selective membrane. Therefore, there is typically one more cationic membrane than the number of anionic membranes. Note that the anolyte solution loses sodium or other cations and the catholyte solution gains sodium or other cations. This is a natural chemical balance that maintains electronic neutrality by generation of hydrogen ion at the anode and by generation of hydroxide ion at the cathode, as shown in equations A1 and C1. Therefore, another necessary attribute of the mixing of the anolyte and catholyte (as done with the pump 60, shown in FIG. 1), is the re-balancing of sodium or other cations before redistribution to the electrodes.

In order to permit and facilitate operation of electrodialysis processing in high brine concentration conditions, e.g., 0.5-8% salt and, in selected preferred embodiments, 1-8% salt), the following processing modifications, techniques or developments can be desirably be applied:
1) balance the electrolyte concentration to be similar or greater than the ion concentration of the water to be treated, e.g., increase the concentration of the electrolyte;
2) operate with the electrolyte at elevated basicity (e.g., pH 9-12) in order to allow better amp flux at lower voltage, e.g., add a strong base (e.g., NaOH) to the electrolyte; and
3) buffer the electrolyte at elevated pH, e.g., add buffering anions to the electrolyte.

In one embodiment of the balancing of the electrolyte concentration technique, the concentration of the electrolyte (e.g., sodium sulfate) is desirably increased to be at least equal to the salt solution being treated.

In one embodiment of operation with the electrolyte at elevated basicity wherein a strong base is added to the electrolyte, after the addition, the resulting electrolyte solution desirably includes sufficient hydroxide ions that reaction at the anode is at least 10% oxidation of hydroxide ions and not more that 90% oxidation of water.

In one embodiment of the addition of buffering anions to the electrolyte technique, suitable added buffering anions can desirably be selected from a group consisting of phosphate, borate and combinations thereof.

Moreover, those skilled in the art and guided by the teachings herein provided will understand and appreciate that two or more of the above-described techniques can be applied in combination if desired in a particular application.

As identified above, we have found that in electrodialysis processing at high brine conditions, i.e., 0.5% to 8% TDS, there is little chance to create a "limiting current" condition at the membrane surfaces because the ionic strength of the brine water solution (concentrate and diluate) is so high. Therefore, there is very little likelihood that the water splitting polarization can occur. The normal resistances that occur at the membranes therefore become less important to the overall process. Potential loss due to initiating and maintaining the redox reactions at the electrodes within the electrolyte solution become relatively more important and define the limiting condition.

In order to economically operate electrodialysis processing in a new range of high brine concentrations (0.5%-8% TDS), we have discovered that it is desirable to operate at low stack voltages and high amperage. This is facilitated by optimizing the chemistry of the electrolyte. We have discovered that more optimal operation at high brine concentrations can be achieved by:
1) Increasing the electrolyte concentration to a level with similar conductivity as the water being treated. For example, 3% salt should be treated with an electrolyte consisting of at least 90 g/L $Na_2SO_4$. A 6% salt should be treated with an electrolyte containing at least 120 g/L $Na_2SO_4$.
2) The addition of a small amount (e.g., 1 g/L) of NaOH (pH around 11) in an unbuffered electrolyte, such as $Na_2SO_4$, causes a surprising drop in voltage needed to achieve ion flux under low voltage conditions. More specifically, the addition of a small amount (1 g/L) of NaOH (pH around 11-12.5) causes a condition that appears to chemically favor the electrode reaction at the anode. The reaction that occurs causes a drop in the "overvoltage" required to initiate and maintain reaction. The overvoltage drop is significant and amounts to between 0.3 and 0.5 V. This surprising result can be directly related to improved amperage (vis. Ion flux) at a given voltage.
3) The pH of the electrolyte can be stabilized with a buffer (typically considered a weak electrolyte) such as the $HPO_4^{-2} \Leftrightarrow PO_4^{-3}$ couple balanced in the range of pH 11-12.
4) A buffer system (up to ⅓ of the total electrolyte concentration) may be added to a strong electrolyte to achieve the benefits of a stable high pH without loss of the benefits of the strong electrolyte. For example, a buffer system such as the $HPO_4^{-2} \Leftrightarrow PO_4^{-3}$ couple (up to ⅓ of the total electrolyte concentration) may be added to a strong electrolyte, such as $Na_2SO_4$, to achieve benefits of a stable high pH without loss of the benefits of the strong electrolyte.

Another aspect of the subject development pertains to a novel self-cleaning technique for the nonconventional use of electrodialysis for extremely high brine concentrations in which the starting water may contain from 0.5%-8% (5,000-80,000 ppm) total dissolved solids (TDS). More specifically, such development is believed to have particular applicability to the maintenance of current efficiency in brines with high concentrations of divalent and trivalent cations. As detailed further below, in accordance with one preferred embodiment, such cleaning technique is sometimes hereinafter referred to as a clean-in-place technique (e.g., clean-in-place pole reversal, or CIP-PR). In such embodiment, a short pulse pole reversal (from several seconds to one minute at an elevated voltage) applied to the electrodes serves to maintain high current density in the presence of divalent and multivalent cations. Examples from complex mixtures of salts and from field samples from natural gas hydraulic fracturing sites have been used to demonstrate the concept.

As detailed below, an in-place method for cleaning the electrodes of an electrodialysis unit in accordance with one aspect of the invention involves applying a pulsed polarity reversal is periodically applied to the electrodes. For example, such periodic pulsed pole reversal can desirably be used to disrupt fouling of the electrode cell by divalent cations. The pole reversal is desirably performed in pulsed mode, such that the pulse may be of a duration of as little as several seconds but, in some embodiments, the duration may be up to one minute. The pulse may be activated on a timed basis (e.g., the frequency of the periodic of application of the pulsed polarity reversal is based on a set time). Alternatively, the pulse may be set to be activated when the current density is determined to be inferior to a set standard. For example, the periodic application of the pulsed polarity reversal can be at a frequency and for a duration based on theoretical current density. In other embodiments, the periodic application of the pulsed polarity reversal can be at a frequency and for a duration based on empirical current density. Further, the pulse, being short in duration, may be of a higher voltage than normal operation.

Pulsed pole reversal as herein provided and described can be performed on many existing electrodialysis systems without any changes to the electronics or hydraulics of the existing units.

Figure 3:
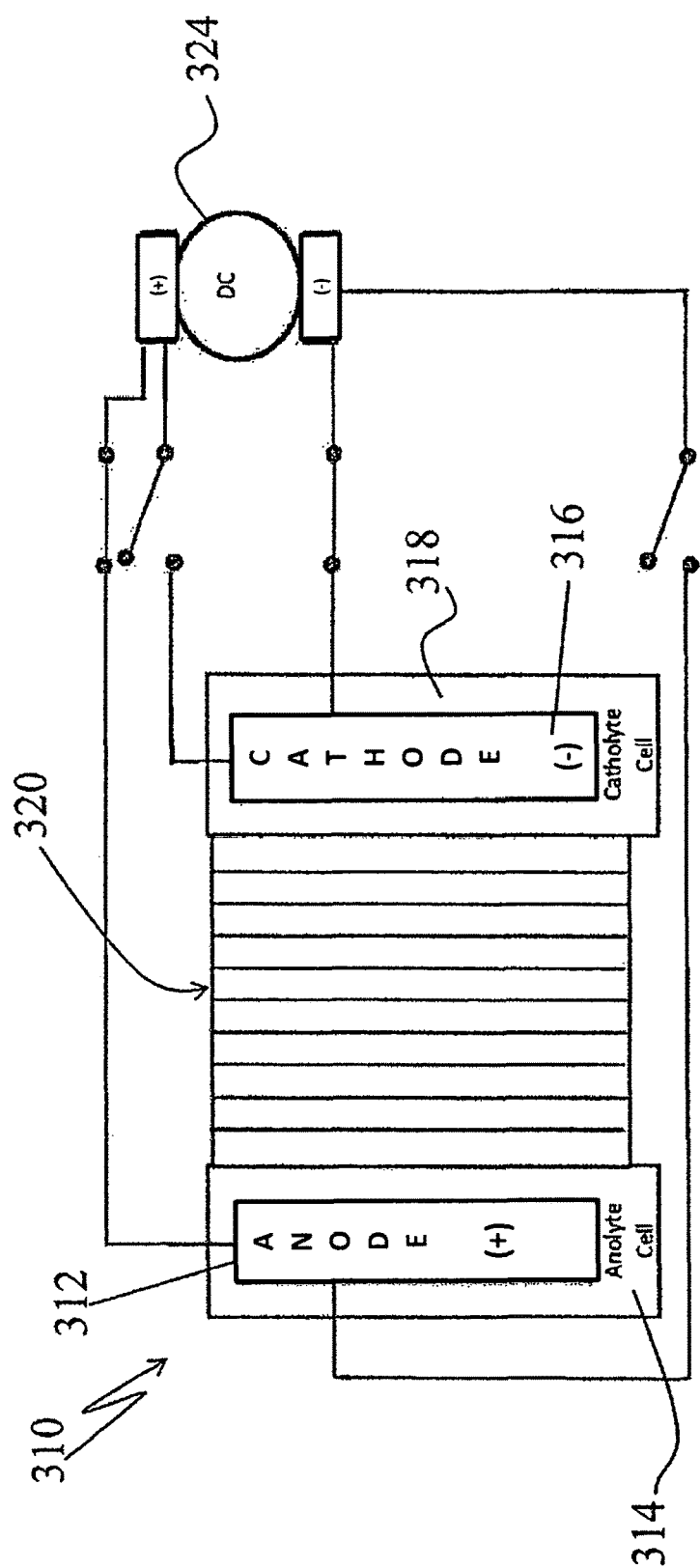
FIG. 3 is a simplified electric diagram of a conventional electrodialysis unit in normal operation.

FIG. 3 presents a simplified electric configuration of a conventional electrodialysis unit, generally designated by the reference numeral 310, in normal operation. The electrodialysis unit 310 includes: an electrode (i.e., an anode) 312 disposed in an electrolyte (i.e., an anolyte) cell 314; an electrode (i.e., a cathode) 316 disposed in an electrolyte (i.e., a catholyte) cell 318 with a membrane stack 320 disposed therebetween. The electrodes, 312 and 316, are appropriately connected to a power supply 324, such as in the form of a DC power supply, to supply power at a desired level.

Figure 4:
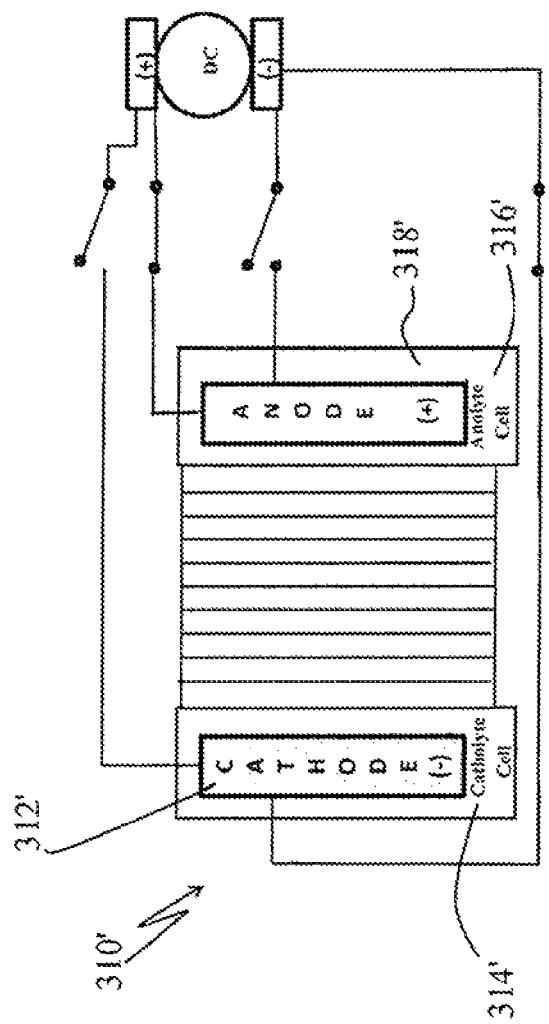
FIG. 4 is a simplified electric diagram of the electrodialysis unit shown in FIG. 3 but now in pole reversal mode.

FIG. 4 presents a simplified electric diagram of the conventional electrodialysis unit shown in FIG. 3 but now in pole reversal cleaning mode and generally designated by the reference 310', in accordance with one embodiment of the invention. With the pole reversal, the electrode 312' now functions as a cathode disposed in an electrolyte (i.e., now a catholyte) cell 314' and the electrode 316' now functions as an anode disposed in an electrolyte (i.e., now an anolyte) cell 318'.

Note, the application of the pulsed polarity reversal can, at least conceptually, be performed simply by switching two pairs of single-pole, single-throw switches.

In accordance with one preferred embodiment, a recommended change to any existing electrodialysis unit challenged with high concentrations of divalent cations is to replace the cathode boundary membrane with a multivalent cation exclusionary membrane. This change can serve as a means of excluding calcium and other divalent cations from the catholyte. In practice, such change has been found effective to exclude up to 75% of the calcium.

In accordance with one preferred embodiment, it is recommended that the anode boundary membrane also be replaced with a multivalent cation exclusionary membrane. With such replacement, unwanted cations can desirably be kept from entering the temporary cathode (normally the anode) cell created during the cleaning pulse.

As pulsed pole reversal is performed in the simple mode shown by FIG. 3 and FIG. 4, during the pole reversal, the normal ion flow from diluate to concentrate is temporarily reversed, causing a back flow of ions from the concentrate to the diluate and thus presenting an inherent inefficiency with such processing. The magnitude of this inefficiency may be calculated by comparing the electricity use, as measured by amp-seconds in the overall forward reaction (normal operation) process compared to the amp-seconds applied during the pole reversal. In various examples, this inefficiency has been found to range from 8 to 13 percent. The pole reversal regimes in these examples, however, were applied arbitrarily, and higher or lower inefficiencies may be encountered if more rigorous pole reversal regimes were to be applied. The pulsed pole reversal may be easily automated and programmed as a response to one of several operational parameters in the ED process.

The exact mechanism of the pulsed pole reversal has not yet been identified and there are several areas in which the pole reversal may be active. One potential area of fouling (herein identified as Type I Fouling) is precipitation at the electrodes. An example of this might be barium sulfate collecting on the electrode surface. Rigorous pole reversal may be able to either dissolve the precipitates, or to cause disruption by vigorous gas evolution. A second area of fouling (herein identified as Type II Fouling) is expected on the multivalent exclusionary membranes. This is likely manifested as a build-up of bulky multivalent cations that are unable to pass through the membrane, creating both a physical and a charge barrier to the passage of sodium across the membrane. Pole reversal could affect this boundary by causing a temporary transport of the bulky ions away from the boundary. A final area of fouling (herein identified as Type III fouling) may be due to cationic precipitates within the membrane stack at the various membrane surfaces. In the event of this type of fouling, it is believed unlikely that the pulsed pole method would act sufficiently quickly to cause the entire stack to revert to a clean condition.

In the simple embodiment, shown in FIG. 3 and FIG. 4, the use of the pole reversal causes an ionic inefficiency where a portion of the ions are caused to back flow from the concentrate to the diluate during the reversal. The preferred embodiment is designed specifically to deal with Type I Fouling caused by precipitation of multivalent cations on the surface of the electrodes or within the electrode cell. This embodiment avoids back flow of ions during pulse reversal.

As detailed further below, in accordance with one preferred embodiment (shown in FIGS. 5-7), each electrode (normally the cathode and the anode) is split into two or more sections that are electronically isolated. In normal operation, the split electrodes within each electrode cell are operated in unison.

Figure 5:
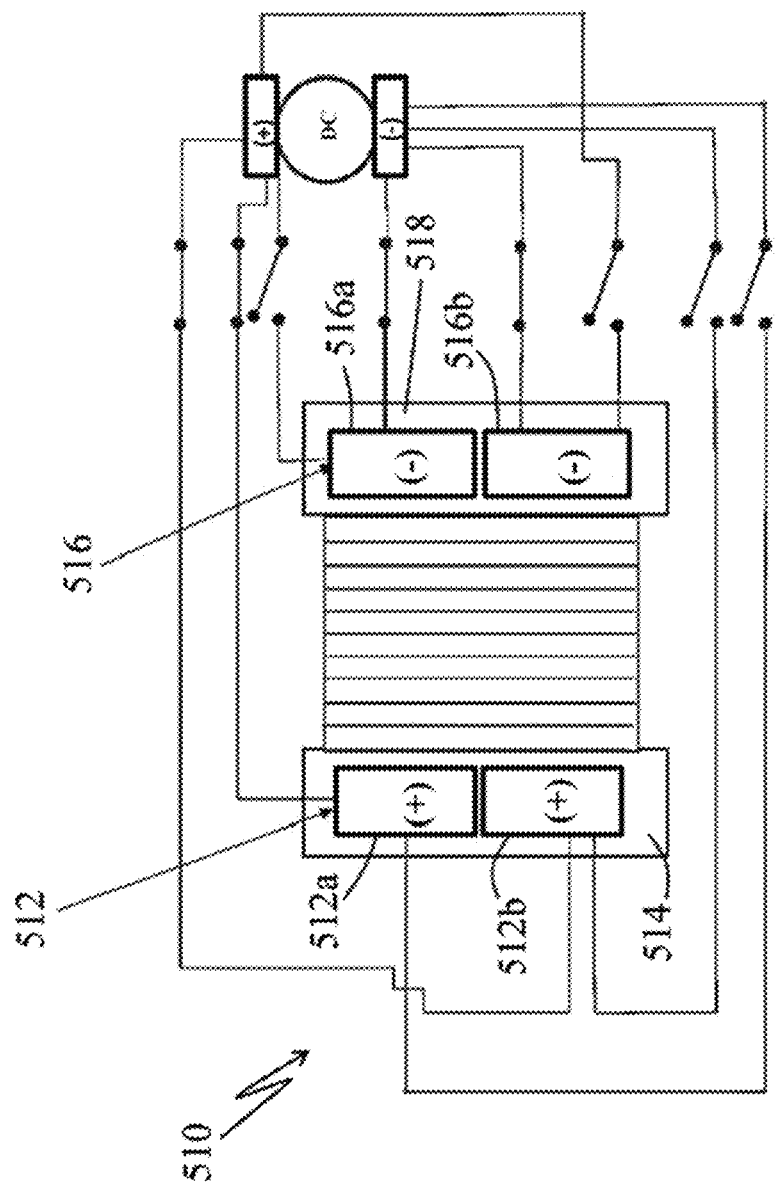
FIG. 5 is a simplified electric diagram of an electrodialysis unit with split electrodes in normal operation.

FIG. 5 presents a simplified electric diagram of an electrodialysis unit, generally designated by the reference numeral 510, with split electrodes in normal operation. The electrodialysis unit 510 includes: a split electrode (i.e., an anode) 512, with split parts 512a and 512b, disposed in an electrolyte (i.e., an anolyte) cell 514; a split electrode (i.e., a cathode) 516, with split parts 516a and 516b, disposed in an electrolyte (i.e., a catholyte) cell 518 with a membrane stack 520 disposed therebetween. As discussed further below, the split electrodes, 512 and 516, are appropriately connected to a power supply 524, such as in the form of a DC power supply, to supply power at a desired level.

Figure 6:
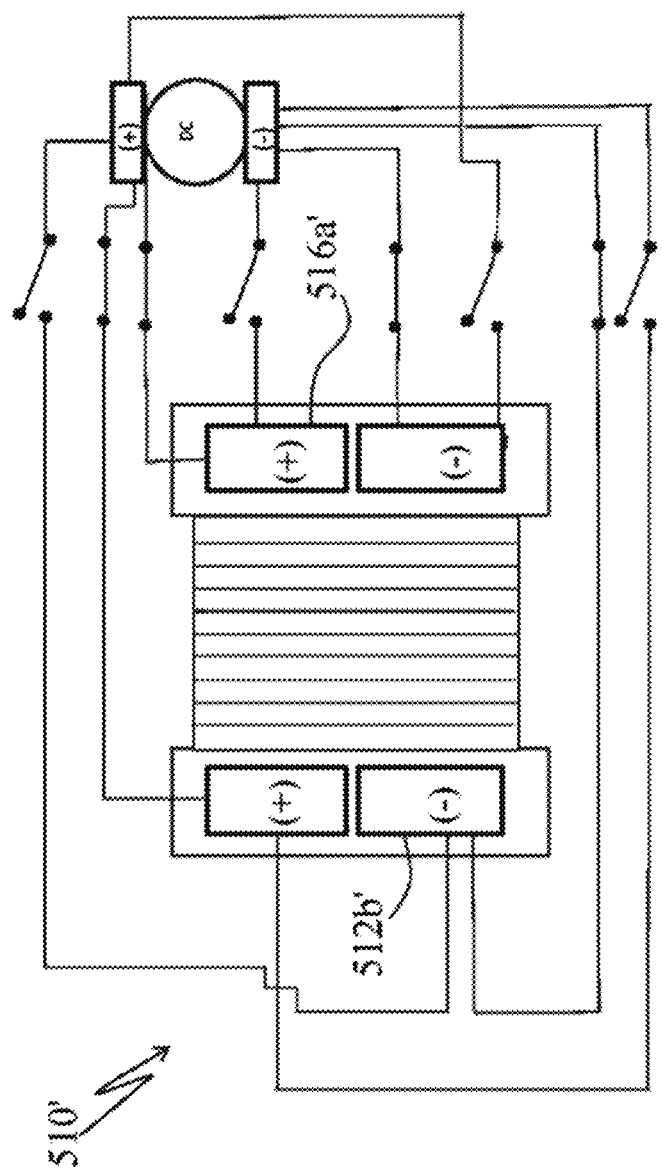
FIG. 6 is a simplified electric diagram of the electrodialysis unit with split electrodes, shown in FIG. 5, but now in a first stage of the pulsed cleaning mode.
Figure 7:
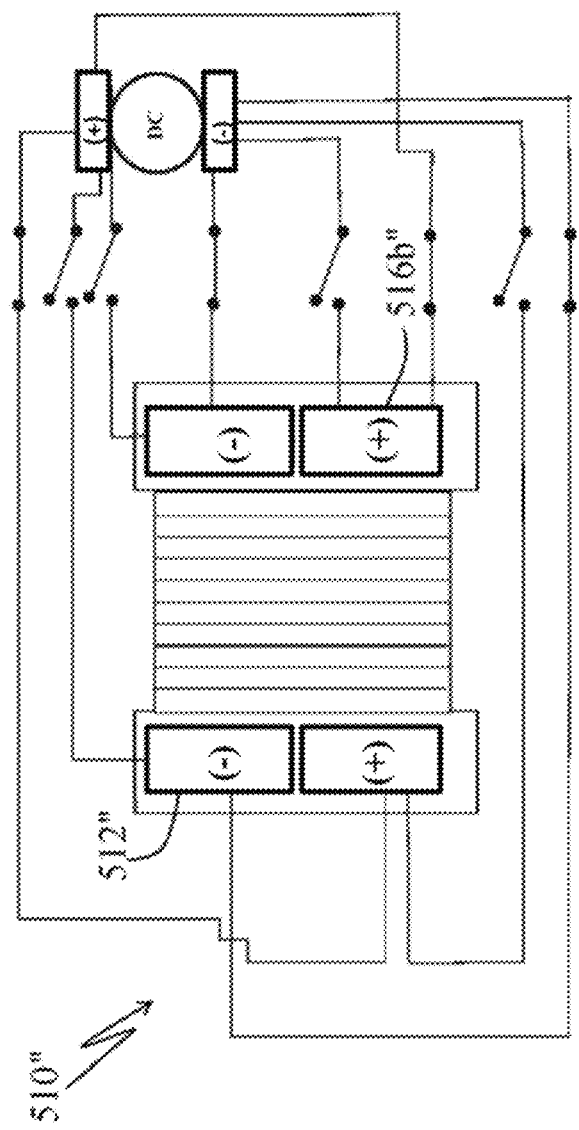
FIG. 7 is a simplified electric diagram of the electrodialysis unit with split electrodes, shown in FIG. 5, but now in a second stage in the cleaning cycle with switched positions of the cathodes and anodes within each electrode cell.

FIG. 6 shows a simplified electric diagram of the electrodialysis unit with split electrodes, shown in FIG. 5, but now in a first stage of the pulsed cleaning mode and generally designated by the reference 510'. FIG. 7 shows a simplified electric diagram of the electrodialysis unit with split electrodes, shown in FIG. 5, but now in a second stage in the cleaning cycle and generally designated by the reference 510", with switched positions of the cathodes and anodes within each electrode cell.

In pulsed cleaning mode (FIG. 6), in a first stage of the pulsed cleaning mode, with the first stage of pole reversal, the split electrode part 512b' now functions as a temporary cathode and the split electrode part 516a' functions as a temporary anode, within the respective electrode cells. The remainder of the unit remains unchanged from what is shown in FIG. 5. The cleansing electric pulse is therefore performed in ionic isolation from the treatment cells, thus avoiding unwanted back flow of ions from the concentrate to the diluate. Note, for diagramming simplicity, FIG. 6 shows that the anodes are first in the top position and cathodes in the bottom position. Those skilled it the art and guided by the teachings herein provided, however, will understand and appreciate that in the broader practice of the invention, the choice of order, sequence, or position of the temporary electrodes is not believed to be critical to the practice of the invention as various alternatives could be diagrammed, all with the same or substantially the same material meaning.

FIG. 7 is a simplified electric diagram that shows the second stage in the cleaning cycle with switched positions of the cathodes and anodes within each electrode cell. That is, as compared to the normal operation shown in FIG. 5, in the second stage of the pulsed cleaning mode, with the second stage of pole reversal, the split electrode part 512a" now also functions as a temporary cathode and the split electrode part 516b" now also functions as a temporary anode, within the respective electrode cells. The remainder of the unit remains unchanged from what is shown in FIG. 5. Alternating the polarity to the temporary electrodes (such as shown in FIG. 7) within each electrode cell is desirable to complete the cleaning cycle.

In an alternate preferred embodiment (shown in FIG. 8 and FIG. 9), a dedicated alternating current power source can be used to create an intense alternating pulse to each set of temporary electrodes.

Figure 8:
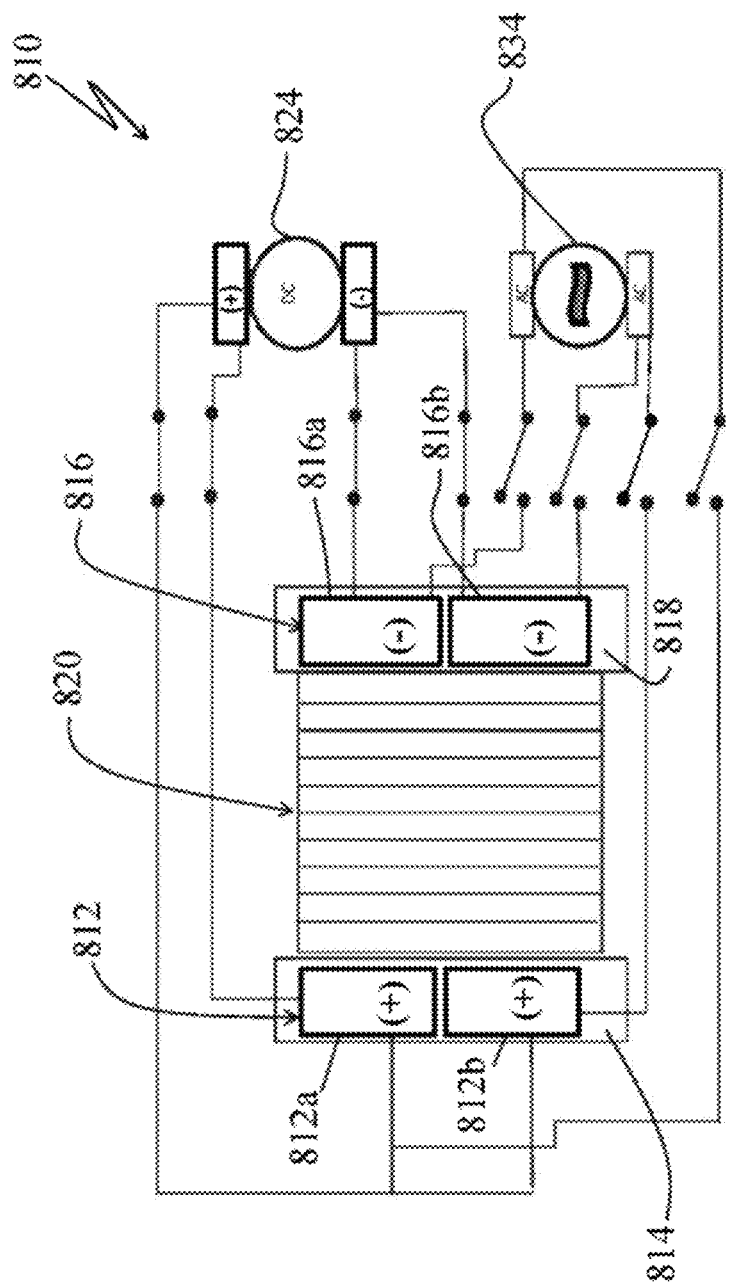
FIG. 8 is a simplified electric diagram of an electrodialysis unit showing an alternating current (AC) cleaning configuration in normal operation mode with the direct current (DC) power source in an "on" position and the AC cleaning source in an "off" position.

FIG. 8 shows a simplified electric diagram of an electrodialysis unit, generally designated by the reference numeral 810, somewhat similar to the electrodialysis unit 510 described above, but with the addition of an alternating current (AC) cleaning configuration.

More specifically, the electrodialysis unit 810 includes: a split electrode (i.e., an anode) 812, with split parts 812a and 812b, disposed in an electrolyte (i.e., an anolyte) cell 814; a split electrode (i.e., a cathode) 816, with split parts 816a and 816b, disposed in an electrolyte (i.e., a catholyte) cell 818 with a membrane stack 820 disposed therebetween. The split electrodes, 812 and 816, are appropriately connected to a power supply 824, such as in the form of a DC power supply, to supply power at a desired level.

In the electrodialysis unit 810, however, the split electrodes, 812 and 816, are also appropriately connected to an AC power supply 834, such as to appropriately provide a periodic cleaning pulse to the electrodes.

Figure 9:
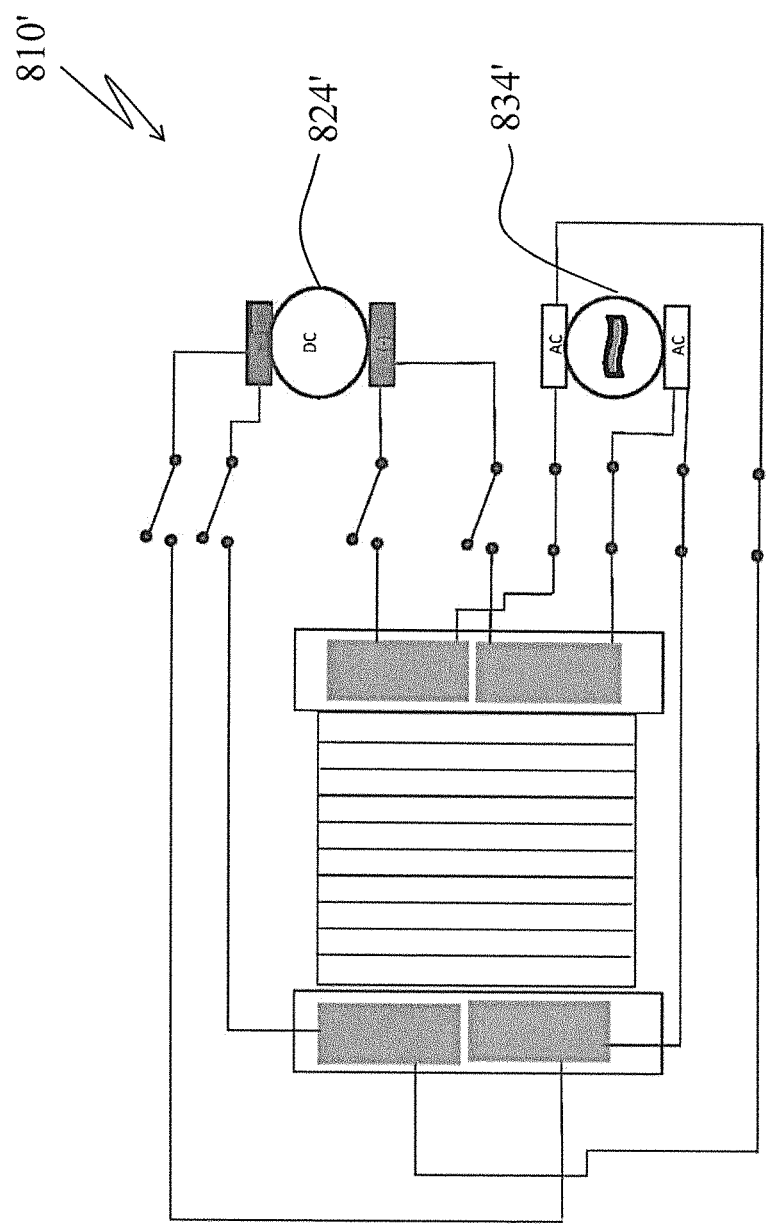
FIG. 9 is a simplified electric diagram of an electrodialysis unit in an AC cleaning configuration with the AC cleaning source in an "on" position and the DC source in an "off" position.

In FIG. 8, the electrodialysis unit 810 is shown in normal operation mode with the direct current (DC) power source 824 in an "on" position and the AC cleaning source 834 in an "off" position. FIG. 9 shows the electrodialysis unit 810 with the AC cleaning source 834 in an "on" position and the DC source 824 in an "off" position.

The result of the electrode pulse cleaning is to drive cations, such as calcium and barium from the electrodes either by resolubilization, or by intense bubble formation (hydrogen at each temporary anode and oxygen at each temporary cathode). If desired, filtration may be beneficially employed to continuously remove offending precipitates such that a suitable steady state condition is created.

If Type II fouling, such as caused by or resulting from charge barriers from a build-up of multivalent cations, is encountered with the electrodialysis unit embodiment of FIGS. 5-7, the unit may still be operated in a manner consistent with the simple embodiment (FIGS. 3 and 4) to at least relieve some of the resistance. Some ionic inefficiency, however, may be incurred.

In accordance with another aspect of the invention, it has been found that electrodialysis processing, particularly as applied to high brine conditions, can be systematically improved via application of heat to increase the operating temperature of at least one of the electrolyte and the treated water stream. That is, heat, including either or both waste heat and direct heat can be applied in or in conjunction with electrodialysis processing to increase the operating temperature of at least one of the electrolyte and the treated water stream. In one embodiment such heat can desirably by applied to increase the operating temperature of both the electrolyte and the treated water stream For example, increasing the operating temperature of the electrolyte in electrodialysis processing has been found beneficial in increasing the current generated by the electrodes at a given voltage.

In electrodialysis processing, both the ion flux across the treatment membranes and the reactions at the electrodes are temperature sensitive. In accordance with one aspect of the invention, the Arrhenius temperature dependency equation can be manipulated to include the effects of both temperatures on the process. To that end, it has been discovered that when the water to be treated is cool and it is not effective to control the water temperature, process kinetics can still be desirably improved by increasing the temperature of the electrolyte.

In one preferred embodiment, waste heat is used to elevate the temperature of the electrolyte to improve the overall ion flux.

In accordance with another aspect of the invention, it has been found that in order to economically operate electrodialysis processing in a new range of high brine concentrations (0.5%-8% TDS), it is necessary to operate at low stack voltages and high current densities. To that end, it has been further found that such operation can advantageously be facilitated by utilizing the natural pH swing that occurs at the electrodes. The cathode generates hydrogen gas at the expense of hydrogen ion and operates more efficiently at lower pH. The anode generates oxygen at the expense of hydroxide and operates more efficiently at higher pH.

Whereas conventional systems and as shown in FIG. 1 commonly operate by blending the catholyte and anolyte (after degassing) to neutralize the generated acids and bases, it is herein proposed that the application of electrolytes should be done in a serial manner such that the acid-rich spent anolyte (after degassing) is sent directly to the cathode and that the spent catholyte (after degassing) is sent directly to the anode. With such practice, the natural pH swing that occurs at the electrodes can be used to full advantage.

Figure 10:
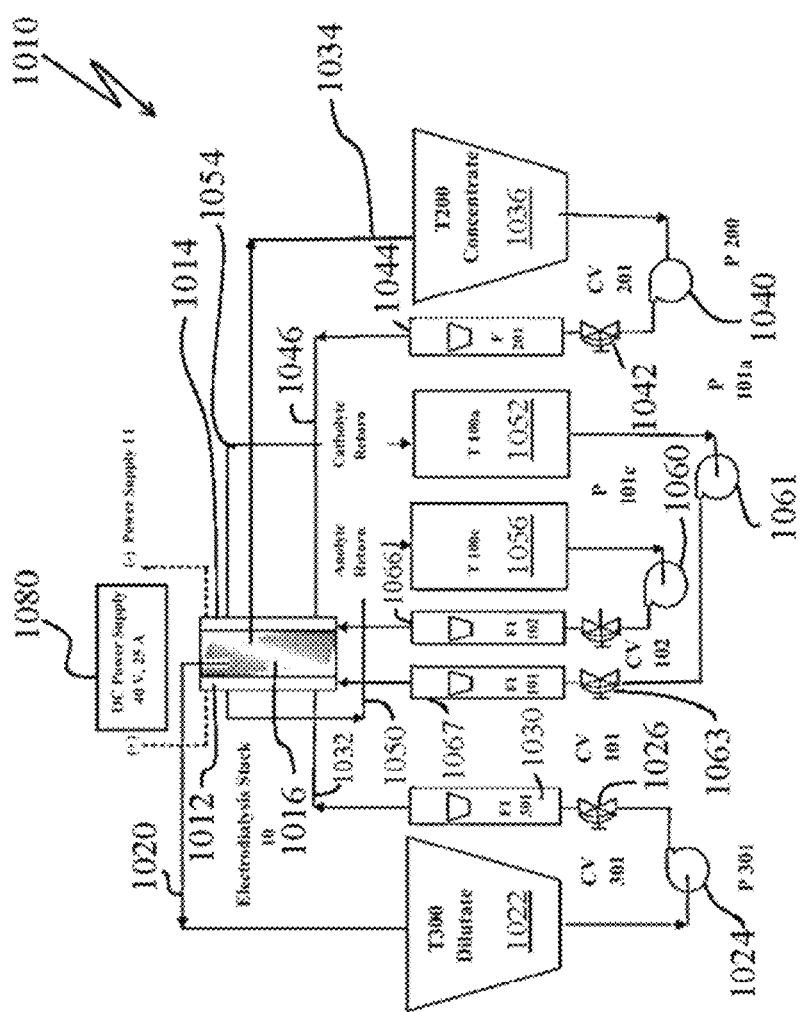
FIG. 10 is a simplified flow diagram of an electrodialysis pilot plant as modified to provide for feed of acid-rich spent anolyte to the cathode and hydroxide-rich spent catholyte to the anode, in accordance with one aspect of the invention.

FIG. 10 is a simplified flow diagram of an electrodialysis pilot plant, generally designated by the reference numeral 1010, that is generally similar to the electrodialysis pilot plant 10 shown in FIG. 1 but now modified to provide for feeding of acid rich spent anolyte to the cathode and hydroxide rich spent catholyte to the anode, in accordance with one aspect of the invention.

Thus, similar to the electrodialysis pilot plant 10, the electrodialysis pilot plant 1010 includes as main components an anode electrode cell 1012, a cathode electrode cell 1014 and a membrane stack 1016 appropriately disposed between the anode and the cathode cells.

Further, the diluate recovered from the membrane stack 1016 is passed via a line 1020 and is collected in a diluate tank 1022. A pump 1024, a control valve 1026, and a rotometer 1030 are used to appropriately deliver and control the flow of diluate via a line 1032 to the diluate manifold within the membrane stack 16.

Also, the concentrate recovered from the membrane stack 1016 is passed via a line 1034 and is collected in a concentrate tank 1036. A pump 1040, a control valve 1042, and a rotometer 1044 are used to appropriately deliver and control the flow of concentrate via a line 1046 to the concentrate manifold within the membrane stack 1016.

In the electrodialysis pilot plant 1010, however, the electrolyte that has passed through the anode cell 1012 is passed via a line 1050 and collected in a catholyte feed tank 1056. Correspondingly, the electrolyte that has passed through the cathode cell 1014 is passed via a line 1054 and collected in an anolyte feed tank 1052.

In the electrodialysis pilot plant 10 design described above, the recovered anolyte (in tank 52) and the recovered catholyte (in tank 56) are remixed by a single feed pump 60 before reapplication to the electrode cells. As will be appreciated by those skilled in the art and guided by the teachings herein provided, this naturally causes the more acidic anolyte and the more basic catholyte to be remixed to a more pH neutral state before being applied to the electrodes.

However, a preferred practice in accordance with one aspect of the invention is to feed a more basic electrolyte to the anode and a more acidic electrolyte to the cathode. This is accomplished as shown in FIG. 10 such that the recovered anolyte is sent to the catholyte feed tank (tank 1056) and after degassing, is fed via a pump 1060, a control valve 1062 and a flow indicator 1066 to the cathode 1014. Correspondingly, the recovered catholyte is directed to the anolyte feed tank (tank 1052) and after degassing, is fed via a pump 1061, a control valve 1063 and a flow indicator 1067 to the anode 1012.

The anode and cathode electrodes, 1012 and 1014, are appropriately connected to a Power Supply 1080 which supplies power at a desired level.

A further advantage of the invention deals with the structure of the electrodialysis system and the way in which sodium, for example, is transported. The cathode cell is separated from the hydraulic cells (the concentrate and diluate cells) by a cationic selective membrane. The hydraulic cell nearest to the cathode is a diluate cell. The anode cell is separated from the hydraulic cells also by a cationic selective membrane. The hydraulic cell nearest to the anode is a concentrate cell.

In order for the electrodialysis system to operate, sodium must be transported away from the diluate cell adjacent to the cathode and into the cathode cell. This is necessitated by the need to maintain ionic balance. The transported sodium replaces a hydrogen ion (which is made into hydrogen gas). Furthermore, sodium must be transported away from the anode and into the concentrate cell adjacent to the anode cell. This is also necessitated by the need to maintain ionic balance. The sodium must leave the anode cell because a hydroxide ion was oxidized into oxygen gas.

As identified above, conventional electrodialysis systems commonly remix the spent electrolytes which restores the sodium balance. However, in accordance with one aspect of the subject development, it is advantageous to feed the anode with sodium-rich electrolyte because there is reduced resistance to forcing the sodium into the adjacent concentrate stream. Additionally, it is advantageous to feed the cathode with sodium-depleted electrolyte because there is less resistance to transporting sodium from the adjacent diluate stream into a weaker sodium solution in the cathode cell.

The serial application of spent catholyte into the anode cell and spent anolyte into the cathode cell advantageously produces the desired sodium concentration swing.

Thus, practice of such aspect of the invention can involve feeding spent catholyte to the anode and spent anolyte to the cathode as a means for improving ion flux and energy efficiency in an electrodialysis stack. In addition or alternatively, practice of such aspect of the invention can involve feeding the anode a more basic electrolyte and feeding the cathode a more acidic electrolyte such as to create a desirable pH swing. In addition or alternatively, practice of such aspect of the invention can involve feeding the anode a stronger sodium solution and feeding the cathode a weaker sodium solution such as to create desirable cation (vis. Sodium) swing.

Those skilled in the art and guided by the teachings herein provided will further understand and appreciate that in the various above-described embodiments, the various electrolyte stream or streams can, if desired, be appropriately filtered such as to remove residue such as to permit or facilitate longer term operation.

Thus, the invention provides improved electrodialysis processing and, more particularly, improved stack performance and electrolyte chemistry and in high brine concentration electrodialysis.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. In an electrodialysis unit comprising an anode and a cathode, the anode and the cathode both having an electrolyte solution of a selected concentration continuously applied to both the anode and the cathode and with a membrane stack disposed between the anode and the cathode, the membrane stack comprising pairs of cationic and anionic selective membranes to segregate increasingly dilute salts streams from concentrated salts streams by acting upon a salt solution, wherein the salt solution, dilute salts streams, and concentrated salts streams are distinct and separate from the electrolyte solution and wherein the salt solution has an ion concentration and contains at least 0.5% TDS, a method for improving ion flux and energy efficiency in the stack, the method comprising at least one technique selected from the group consisting of increasing the concentration of the electrolyte solution to balance the electrolyte concentration to be similar or greater than the ion concentration of the salt solution wherein the electrolyte solution comprises sulfate anions, adding a strong base to the electrolyte solution to increase electrolyte solution pH to 9-12, and adding buffering anions to the electrolyte solution, where the electrolyte solution has a pH of 11-12.

2. The method of claim 1 wherein the selected technique is increasing the concentration of the electrolyte solution to balance the electrolyte concentration to be similar or greater than the ion concentration of the salt solution.

3. The method of claim 2 wherein the concentration of the electrolyte solution is increased to be at least equal to the salt solution being treated.

4. The method of claim 2 wherein the electrolyte solution comprises sodium sulfate.

5. In an electrodialysis unit comprising an anode and a cathode, the anode and the cathode both having an electrolyte solution of a selected concentration continuously applied to both the anode and the cathode and with a membrane stack disposed between the anode and the cathode, the membrane stack comprising pairs of cationic and anionic selective membranes to segregate increasingly dilute salts streams from concentrated salts stream by acting upon a salt solution that is distinct and separate from the electrolyte solution and wherein the salt solution has an ion concentration and contains at least 0.5% TDS, a method for improving ion flux and energy efficiency in the stack, the method comprising:
adding a strong base to the electrolyte solution to increase electrolyte solution pH to 9-12.

6. The method of claim 5 wherein the strong base is sodium hydroxide.

7. The method of claim 5 wherein after the addition the resulting electrolyte solution comprises sufficient hydroxide ions that reaction at the anode is at least 10% oxidation of hydroxide ions and not more than 90% oxidation of water.

8. In an electrodialysis unit comprising an anode and a cathode, the anode and the cathode both having an electrolyte solution of a selected concentration continuously applied to both the anode and the cathode and with a membrane stack disposed between the anode and the cathode, the membrane stack comprising pairs of cationic and anionic selective membranes to segregate increasingly dilute salts streams front concentrated salts stream by acting upon a salt solution that is distinct and separate from the electrolyte solution and wherein the salt solution has an ion concentration and contains at least 0.5% TDS, a method for improving ion flux and energy efficiency in the stack, the method comprising:

adding buffering anions to the electrolyte solution, where the electrolyte solution has a pH of 11-12.

9. The method of claim 8 wherein the added buffering anion is selected from the group consisting of phosphate, borate and combinations thereof.

10. The method of claim 9 wherein the added buffering anion is phosphate.

11. The method of claim 9 wherein the added buffering anion is borate.

12. The method of claim 5 additionally comprising increasing the concentration of the electrolyte solution to balance the electrolyte concentration to be similar or greater than the ion concentration of the salt solution.

13. The method of claim 8 additionally comprising increasing the concentration of the electrolyte solution to balance the electrolyte concentration to be similar or greater than the ion concentration of the salt solution.

14. In an electrodialysis unit comprising an anode and a cathode, the anode and the cathode both having an electrolyte solution of a selected concentration continuously applied to both the anode and the cathode and with a membrane stack disposed between the anode and the cathode, the membrane stack comprising pairs of cationic and anionic selective membranes to segregate increasingly dilute salts streams from concentrated salts stream by acting upon a salt solution that is distinct and separate from the electrolyte solution and wherein the salt solution has an ion concentration and contains at least 0.5% TDS, a method for improving ion flux and energy efficiency in the stack, the method comprising:

adding a strong base to the electrolyte solution to increase electrolyte solution pH to 9-12 and adding buffering anions to the electrolyte solution.

15. The method of claim 5 additionally comprising increasing the concentration of the electrolyte solution to balance the electrolyte concentration to be similar or greater than the ion concentration of the salt solution, and adding buffering anions to the electrolyte solution.

* * * * *